(No Model.)
L. ATWOOD.
COG WHEEL.
No. 430,818. Patented June 24, 1890.
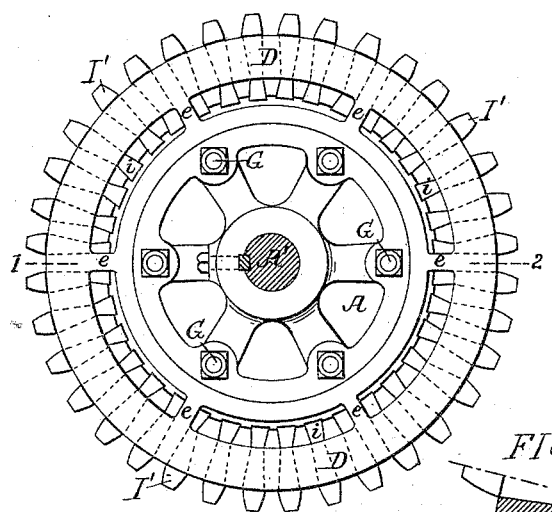
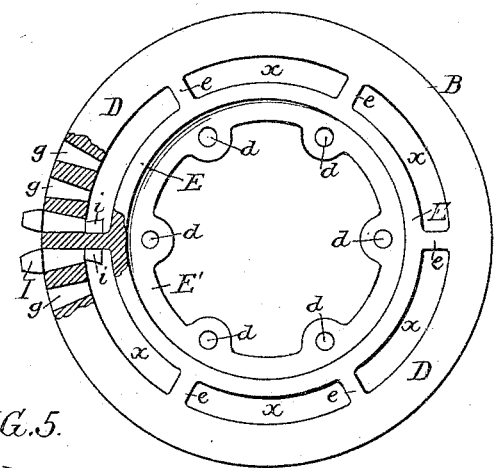
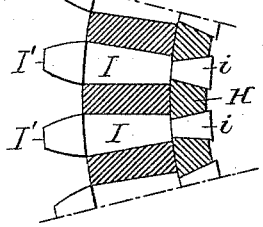
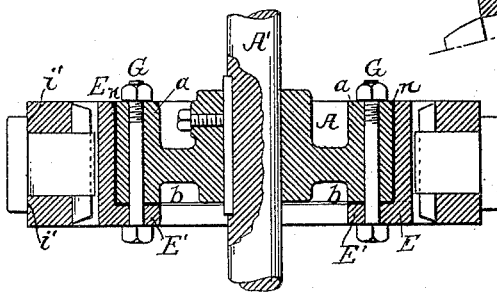
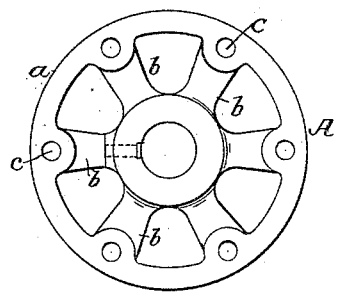
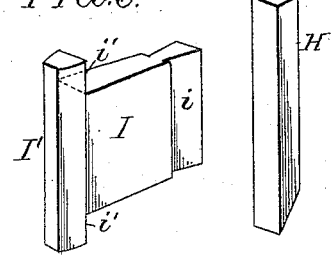
Witnesses:
Alex. Barkoff
William D. Conner
Inventor:
Leonard Atwood
by his Attorneys
Howson & Howson

UNITED STATES PATENT OFFICE.

LEONARD ATWOOD, OF PHILADELPHIA, PENNSYLVANIA.

COG-WHEEL.

SPECIFICATION forming part of Letters Patent No. 430,818, dated June 24, 1890.

Application filed March 20, 1890. Serial No. 344,662. (No model.)

*To all whom it may concern:*

Be it known that I, LEONARD ATWOOD, a citizen of the United States, and a resident of Philadelphia, Pennsylvania, have invented certain Improvements in the Construction of Cog-Wheels, of which the following is a specification.

The object of my invention is to construct a sectional cog-wheel provided with detachable teeth, in a manner fully described hereinafter, reference being had to the accompanying drawings, in which—

Figure 1 is a face view of my improved wheel. Fig. 2 is a section on the line 1 2, Fig. 1. Fig. 3 is a face view, partly in section, of the rim. Fig. 4 is a view of the center. Fig. 5 is an enlarged view showing the application of the teeth to the rim. Fig. 6 is a perspective view of one of the teeth, and Fig. 7 is a perspective view of the wedge for the teeth.

A is the center of the wheel, which can be mounted on a suitable shaft A'. This center A has a ring $a$ and spokes $b$, and in the ring are a series of orifices $c$.

B is the rim formed of an outer ring D and an inner ring E, connected together at intervals by tie-pieces $e$. On the ring E is a flange E', having a series of orifices $d$, coinciding with the orifices $c$ in the ring $a$ of the center A. Transverse bolts G pass through this flange E' and the ring $a$, thus securing the center to the rim. The outer ring D has a series of radial tapered openings $g$, in which are inserted the teeth I, made, preferably, of hard wood. These teeth project through the ring into the space $x$ between the rings D and E, and have undercut shanks $i$, and fitting between the shanks of adjoining teeth are wedges H, (clearly shown in Fig. 7,) which firmly hold the teeth in their sockets $g$. By this arrangement of parts the cog-wheel can be readily constructed and repaired, and the rim and its cog-teeth can be readily removed from the center without removing the shaft, and any one of the teeth can be removed from its socket and replaced without interfering with the other teeth of the wheel. By having the rings D and E united by the tie-pieces $e$ a certain amount of elasticity is obtained, together with the bolting of the center to the ring, and the insertion of elastic packing $n$ between the two, as shown in Fig. 2, enables the use of a cog constructed on this principle of great advantage in connection with electric motors, and especially with electric-motor-driven cars, as the gears run much more smoothly and the sound is deadened to a certain degree by the elastic packing. Where the side of a tooth rests against the tie-piece, as shown in Fig. 3, that side of the tooth is perfectly flat, while the opposite side is undercut to receive the wedge.

I claim as my invention—

1. The combination of the center, adapted to be secured to a shaft, a rim, transverse bolts securing the rim to the center with detachable teeth having undercut shanks, and keys adapted to secure the teeth to the ring, substantially as described.

2. The combination of the center with the rings D and E, said ring E secured to the center, and the ring D, having teeth and connected to the ring E by tie-pieces, substantially as described.

3. The combination of the wheel-center, having a series of orifices, rings D and E, tie-pieces $e$, connecting the rings D and E together, a flange on the ring E, having orifices, and bolts passing through the orifices in the flange and in the rim of the center with detachable teeth secured to the ring D, substantially as described.

4. The combination of the center, the rim composed of two rings tied together, and transverse bolts securing the rim to the center with elastic packing between the rim and center, substantially as set forth.

In testimony whereof I have signed my name to this specification in the presence of two subscribing witnesses.

LEONARD ATWOOD.

Witnesses:
HENRY HOWSON,
HARRY SMITH.